(12) United States Patent
Phillips et al.

(10) Patent No.: US 7,600,739 B2
(45) Date of Patent: Oct. 13, 2009

(54) COMPARTMENTALIZED ELECTRIC/MANUAL GATE VALVE

(75) Inventors: David L. Phillips, Santa Ana, CA (US); Ashfaq M. Mir, Fountain Valley, CA (US); Rufino Naval, Jr., San Juan Capistrano, CA (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 60 days.

(21) Appl. No.: 11/728,031

(22) Filed: Mar. 22, 2007

(65) Prior Publication Data

US 2008/0230125 A1 Sep. 25, 2008

(51) Int. Cl.
*F16K 31/44* (2006.01)

(52) U.S. Cl. .................. 251/266; 251/326; 251/328

(58) Field of Classification Search ............. 251/264, 251/266, 326, 327, 328, 329
See application file for complete search history.

(56) References Cited

U.S. PATENT DOCUMENTS

| | | | |
|---|---|---|---|
| 426,429 A | 4/1890 | Browne | |
| 811,212 A | 1/1906 | Giddings | |
| 1,868,147 A | 7/1932 | Kruse | |
| 2,109,042 A | 2/1938 | Bennett et al. | |
| 2,669,416 A | 2/1954 | Hilton | |
| 2,770,532 A | 11/1956 | Mason | |
| 3,079,442 A * | 2/1963 | Kulik et al. | 568/38 |
| 3,226,081 A * | 12/1965 | Milleville | 251/355 |
| 3,333,814 A | 8/1967 | Sargent | |
| 3,463,193 A | 8/1969 | Yost | |
| 3,941,349 A | 3/1976 | Pierson | |
| 4,141,378 A | 2/1979 | Wegner et al. | |
| 4,231,389 A | 11/1980 | Still et al. | |
| 4,275,866 A | 6/1981 | Jamar | |
| 4,550,453 A | 11/1985 | Norman | |
| 4,875,504 A | 10/1989 | Nicholson | |
| 5,364,066 A * | 11/1994 | Dorste et al. | 251/122 |
| 5,445,190 A | 8/1995 | Gunder | |
| 5,653,423 A * | 8/1997 | Young et al. | 251/328 |
| 5,678,802 A | 10/1997 | Lunder | |
| 5,988,221 A | 11/1999 | Walker | |
| 6,776,184 B1 | 8/2004 | Maichel et al. | |
| 2006/0091347 A1 | 5/2006 | McGuire et al. | |

FOREIGN PATENT DOCUMENTS

DE 003209176 A1 9/1983
JP 402209687 A 8/1990

* cited by examiner

*Primary Examiner*—John K Fristoe, Jr.

(57) ABSTRACT

The present invention provides a gate valve for controlling the flow of a medium through suitable plumbing, featuring a valve housing for coupling the gate valve to the suitable plumbing; a detachable drive unit having a movable blade arranged therein; detachable blade seals for slidably arranging in the valve housing in order to receive the movable blade to control the flow of the medium through the gate valve and to prevent the medium from entering the drive unit; and a latching mechanism for detachably coupling both the drive unit and blade seals to and from the valve housing so as to replace either the drive unit, the blade seals, or both, without having to remove the gate valve from the suitable plumbing.

19 Claims, 5 Drawing Sheets

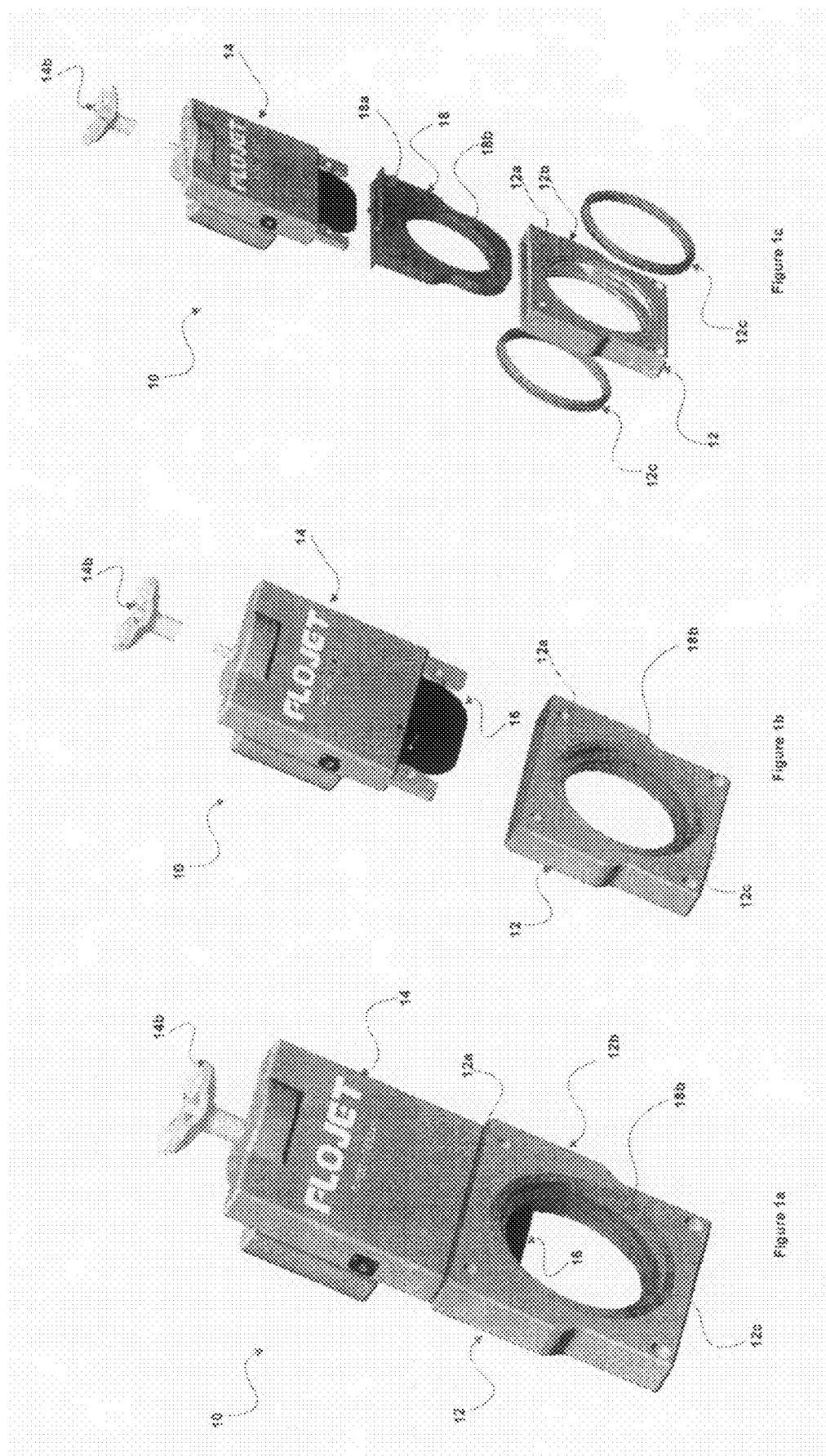

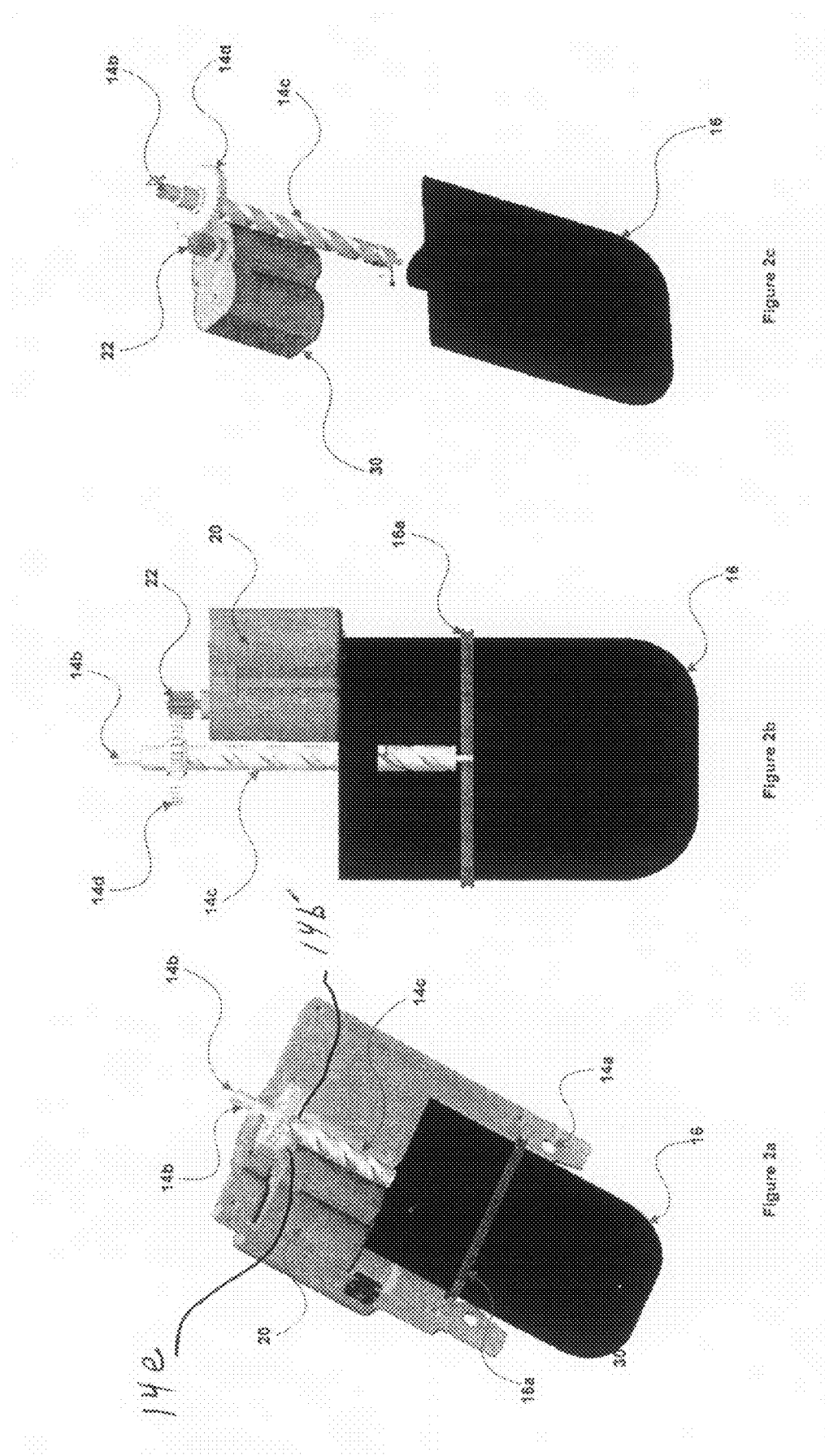

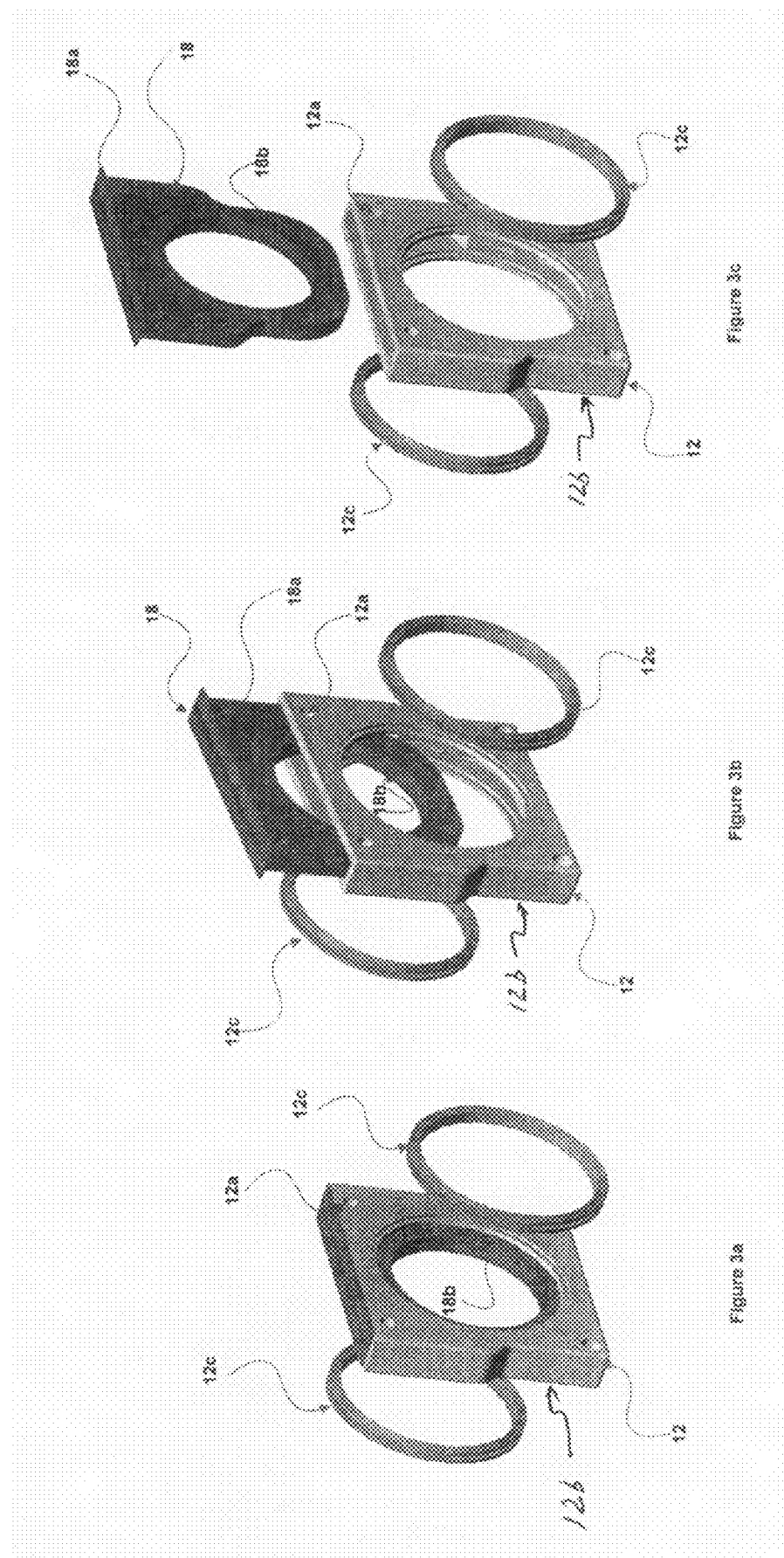

COMPARTMENTALIZED ELECTRIC/MANUAL GATE VALVE

BACKGROUND OF THE INVENTION

1. Field of the Invention

The present invention relates to a valve; and more particularly to a gate valve for controlling the flow of a medium through suitable plumbing.

2. Brief Description of Related Art

There are several electric gate valves and many manual valves on the market. They operate electrically or manually, pulling a blade valve open to allow flow. The shortcomings of these items are seal leakage, leaking around the handle, access, sticking, difficult maintenance and service, difficult replacement. The shortcomings of the electric valves also include the fact that they are usually a rack and pinion kind of gear on one side of the valve blade, which tends to offset and jam the valve blades especially when the gate valve is mounted at an angle. And in case of the manual valves they have the shaft fastened on to the valve blade which in turn makes the open stroke longer, requiring more area to operate.

SUMMARY OF THE INVENTION

In its broadest sense, the present invention provides a new and unique gate valve for controlling the flow of a medium through a suitable plumbing line or system, featuring a valve housing for coupling the gate valve to the suitable plumbing; a detachable drive unit having a movable blade arranged therein; detachable blade seals or blade seal cartridge for slidably arranging in the valve housing in order to receive the movable blade to control the flow of the medium through the gate valve and to prevent the medium from entering the drive unit; and a latching mechanism for detachably coupling both the drive unit and blade seals or blade seal cartridge to and from the valve housing so as to replace either the drive unit, the blade seals, or both, without having to remove the valve housing from the suitable plumbing line or system.

The latching mechanism may include corresponding apertures in the detachable drive unit and blade seals or blade seal cartridge that align with associated apertures in the valve housing and corresponding fastening devices for passing through the corresponding apertures to detachably couple the drive unit and blade seals to and from the valve housing. Embodiments are also envisioned where the latching mechanism includes a first latching mechanism for coupling the driving unit to the blade seals and a second latching mechanism for coupling the blade seals to the valve housing; or where the latching mechanism couples the driving unit to the valve housing and holds the blade seals or blade seal cartridge therein.

The drive unit may include a drive with drive threads and the blade may include corresponding threads for coupling to the drive threads of the drive to rotatably drive the movable blade up and down. In operation, the movable blade slides between the blade seals or blade seal cartridge that sweep the blade clean keeping the medium from entering the drive unit.

In one embodiment, the drive unit may be motorized. In this case, the drive has a gear arranged thereon, and the drive unit may include a motor with a gear coupled to the gear of the drive for electromechanically rotating the drive. The drive unit may also include a detachable clip for frictionally engaging the shaft of the drive to switch the drive unit between an electrical or manual operational mode. The shaft of the drive has at least one portion having a smaller diameter than the shaft for receiving the detachably clip.

Alternatively, the drive unit may be manually operated by pulling the drive shaft up, disengaging the gear from the motor and then manually rotating the drive.

By compartmentalizing the design, the wet or medium area is separated from the drive area, essentially allowing for the user to install the gate valve and then by mechanical latching take the drive unit off and replacing the drive unit with either the manual or the motorized version. One can also replace the seals without needing to remove the valve housing from the plumbing line or system. By having the blade ride up and down the drive shaft, the blade design is very compact and at the same time avoids the problem of jamming the blade by keeping the pull force constant and centered on the blade.

Applications of the present invention include recreational vehicles (RVs), marine, industrial, pool and spas, as well as agricultural

BRIEF DESCRIPTION OF THE DRAWING

FIGS. 1a, 1b and 1c show a gate valve according to the present invention, where FIG. 1a is a perspective view of the gate valve; where FIG. 1b is a partially exploded perspective view of the gate valve shown in FIG. 1a; and where FIG. 1c is a fully exploded perspective view of the gate valve shown in FIG. 1a.

FIGS. 2a, 2b and 2c show the drive unit 14 of the gate valve shown in FIG. 1a according to the present invention, where FIG. 2a is a view of the inside of the drive unit; where FIG. 2b is a view of the drive with gear and thread, drive motor and blade of the drive unit shown in FIG. 2a; and where FIG. 2c is a partially exploded view of the drive with gear and thread, drive motor with gear and blade shown in FIG. 2b.

FIGS. 3a, 3b and 3c show the valve housing of the gate valve shown in FIG. 1a according to the present invention, where FIG. 3a is one partially exploded perspective view of the valve housing shown in FIG. 1a; where FIG. 3b is another partially exploded perspective view of the valve housing shown in FIG. 3a; and where FIG. 3c is a fully exploded perspective view of the valve housing shown in FIG. 3a.

FIG. 4a is a side view of the assembled seal housing; where FIG. 4b is a perspective view of the assembled seal housing shown in FIG. 4a; where FIG. 4c is a partially exploded perspective view of the assembled seal housing shown in FIG. 4a having the seal removed from the housing with the plumbing still in place; and where FIG. 4d is a fully exploded perspective view of the assembled seal housing shown in FIG. 4a.

DETAILED DESCRIPTION OF THE INVENTION

Figure 4B:
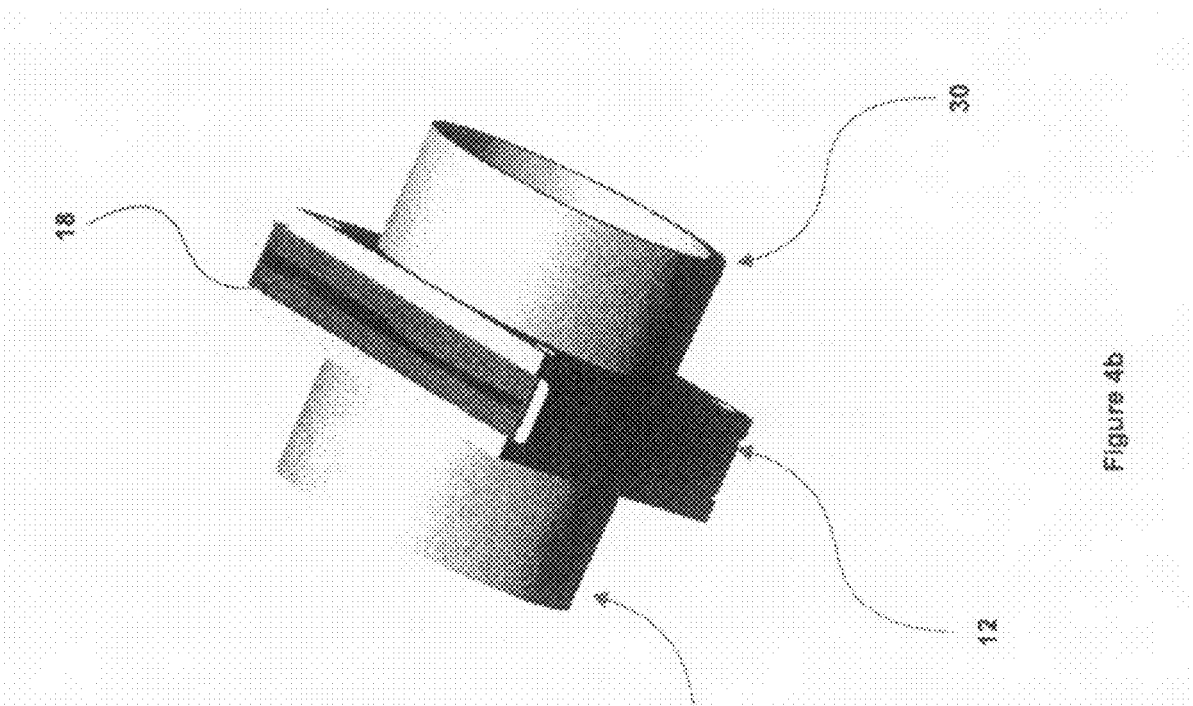
FIGS. 4a, 4b, 4c and 4d show an assembled seal housing according to the present invention, where
Figure 4A:
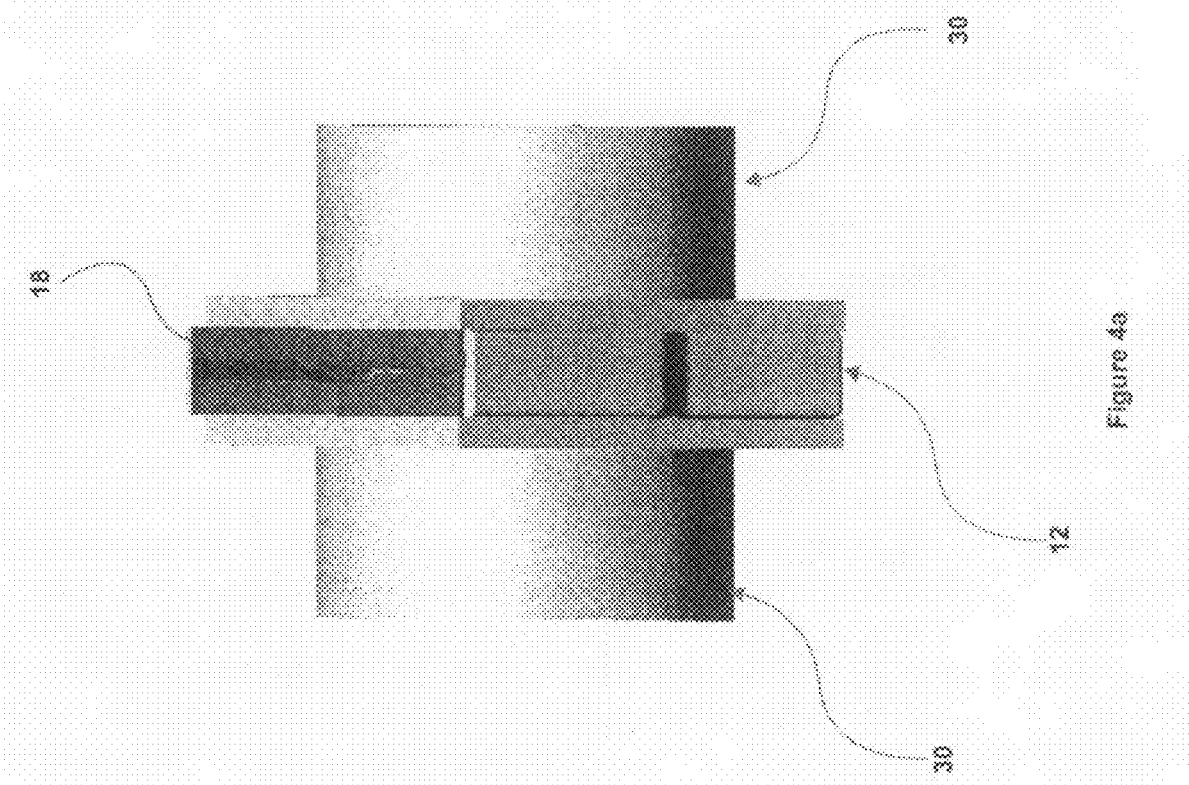
Figure 4D:
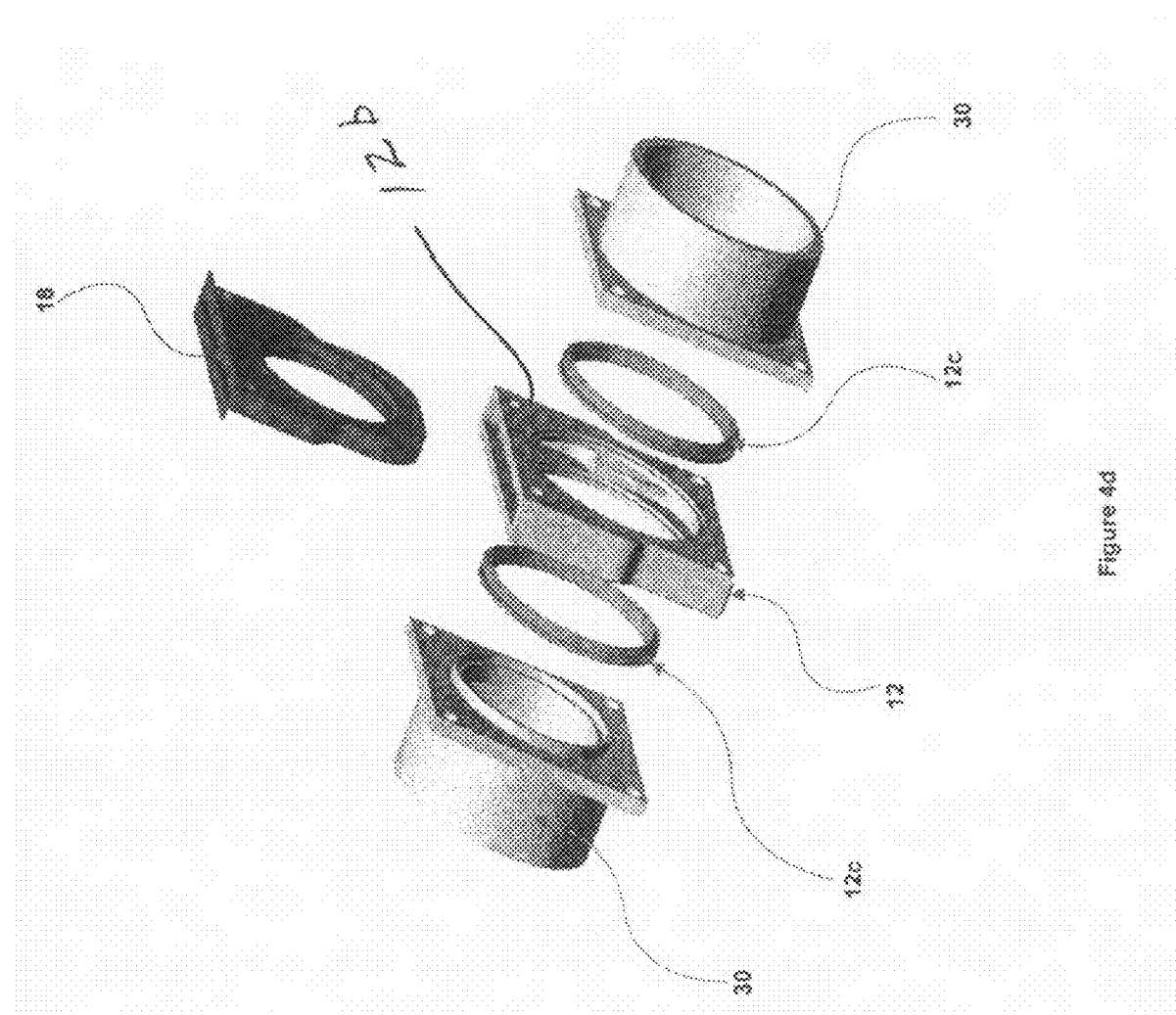
Figure 4C:
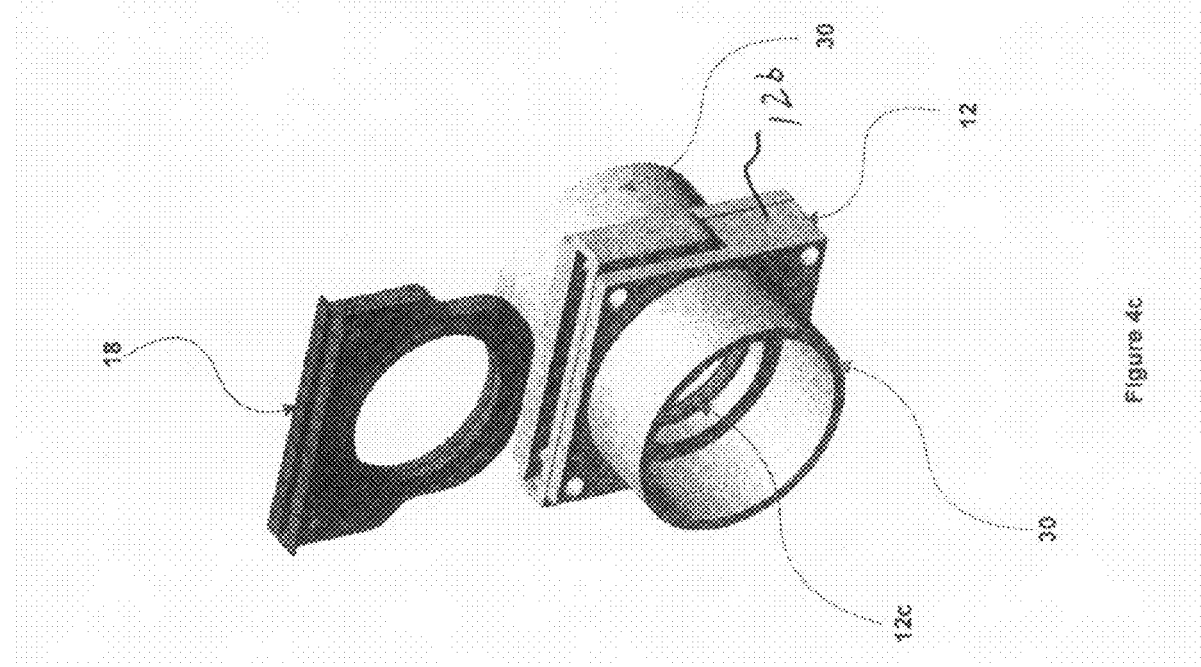

FIGS. 1a, 1b and 1c show an embodiment of a new and unique gate valve generally indicated as 10 for controlling the flow of a medium through suitable plumbing (see FIGS. 4a, 4b, 4c, 4d), featuring a valve housing (which may also be referred to as an "adapter unit") generally indicated as 12 for coupling the gate valve 10 to the suitable plumbing (see FIG. 4a, 4b, 4c, 4d); a detachable drive unit generally indicated as 14 having a movable blade 16 arranged therein; detachable blade seals or blade seal cartridge 18 for slidably arranging in the valve housing 12 in order to receive the movable blade 16 to control the flow of the medium through the gate valve 10 and to prevent the medium from entering the drive unit 14; and a latching mechanism 12a, 14a, 18a, for detachably coupling both the drive unit 14 and blade seals or blade seal cartridge 18 to and from the valve housing 12 so as to replace either the drive unit 14, the blade seals or blade seal cartridge 18, or both, without having to remove the valve housing 12 from the suitable plumbing (see FIG. 4a, 4b, 4c, 4d).

The latching mechanism 12a, 14a, 18a may include, by way of example, corresponding apertures 14a, 18a in the detachable drive unit 14 and blade seals or blade seal cartridge 18 that align with associated apertures 12a in the valve housing 12 and corresponding fastening devices (not shown) for passing through the corresponding apertures 12a, 14a, 18a to detachably couple the drive unit 14 and blade seals 18 to and from the valve housing 12.

Embodiments are also envisioned either where the latching mechanism includes two mechanism, such as a first latching mechanism for coupling the driving unit 14 to the blade seals 18 and a second latching mechanism for coupling the blade seals 18 to the valve housing 12; or where the latching mechanism couples the driving unit 14 to the valve housing 12 and holds the blade seals or blade seal cartridge 18 therein.

FIGS. 2a, 2b and 2c show the drive unit 14 in further detail, which may include a drive 14b with drive threads 14c and the blade 16 may include corresponding threads (not shown) for coupling to the drive threads 14c of the drive 14 to rotatably drive the movable blade 16 up and down. In operation, the movable blade 16 slides between the blade seals 16a that sweep the blade 16 clean keeping the medium from entering the drive unit 14.

In one embodiment, the drive unit 14 may be motorized. In this case, the drive 14b has a gear 14d arranged thereon, and the drive unit may include a motor 20 with a gear 22 coupled to the gear 14d of the drive 14b for electromechanically rotating the drive 14b. The drive unit 14 may also include a wave spring 14e for frictionally engaging the shaft 14b' of the drive 14b to switch the drive unit 14 between an electrical or manual operational mode.

Alternatively, the drive unit 14 may be manually operated by pulling the shaft 14b up, disengaging the gear 14d from the motor 22, and manually rotating the drive 14b.

In operation, the drive unit or housing 14 provides the drive to move the blade 16 up and down. The drive 14b can be operated either manual or motorized. The drive 14b is unique in that it allows in about two full turns for the user to fully open the gate valve. This results in less room being required to operate the gate valve as one does not have to pull a handle out. In the embodiment shown and described herein, the drive shaft 14c has two parallel tracks which accommodates a lubricated steel balls (not shown) or internal threads which in turn are housed in the blade 16. This reduces the frictional force loss considerably. In the motorized version, the motor 22 is geared to allow the user to turn the switch on and open the gate valve. In the event power is not available or the motor 22 fails, the same simple pull and turn allows the user to manually override the motor 22 and open and close the gate valve. The compartmentalized design of the gate valve 10 then allows the user to simply unlatch the drive unit 14 and replace it with another drive unit cartridge with no need for disassembling the plumping. The blade 16 forms part of the drive unit 14, and is designed so as to slide up and down the drive unit 14 itself with the drive 14b not moving out of the gate valve itself thus allowing for less room to be needed.

The valve housing 12 has a lower housing 12b (see FIGS. 1a and 1c) that has plumbing seals 12c and contains the blade seals or blade seal cartridge 18. As shown in FIGS. 4a, 4b, 4c, 4d, the valve housing 12 is installed into the plumbing line or system (not shown) using adapters 30 in the plumbing line and left permanently. The valve housing 12 receives or accepts the drive unit 14 into it and the two latches together, as described herein. The blade seals or blade seal cartridge 18 have seals 18b that the blade 16 slips through that each operation of the gate valve sweeps the blade 16 clean keeping the waste in the valve housing 12 and separate from the drive unit 14.

ALTERNATIVE EMBODIMENT

Embodiments are also envisioned where the drive unit 14 includes a detachable clip (not shown) for frictionally engaging the shaft 14b' of the drive 14b to switch the drive unit 14 between an electrical or manual operational mode. In this case, the shaft 14b' of the drive 14b may have at least one portion having a smaller diameter than the shaft for receiving a detachably clip for holding the shaft 14b in, for example, the manual operational mode.

The Method for Replacing Seals

The present invention also features a new and unique method for replacing seals in recreational vehicles gate valves without removing the valve housing 12 from plumbing system.

The method for replacing blade seals or the blade seal cartridge in the gate valve 10 features coupling the valve housing 12 of the gate valve 10 to the suitable plumbing system, the valve housing 12 having the removable blade seal or blade seal cartridge 18 slidably arranged and latched therein in order to receive the movable blade 16 of the drive unit 14 of the gate valve 10 to control the flow of the medium through the gate valve 10 and to prevent the medium from entering the drive unit 14; and unlatching the removable blade seal cartridge 18 from the valve housing 12 so as to enable replacement of the blade seal cartridge 18 and/or seals 18b without having to remove the valve housing 12 from the suitable plumbing.

The unlatching may include removing the one or more fastening devices (not shown) from one or more apertures 12a, 14a, and 18a coupling the blade seal cartridge 18 and the valve housing 12, as well as uncoupling the drive unit 14 and the blade seal cartridge 18 as part of the method.

The blade seal cartridge 18 is unique in that it allows the user to leave the valve housing 12 in the plumbing system or line and replace the blade seals or blade seal cartridge 18 by simply pressing it together and pulling it out of the valve housing 12, then replacing the seals 18b and/or the whole blade seal cartridge 18, and then sliding it back in the valve housing 12. Then by simply reinstalling the drive unit 14, one can resume usage. The seals 18b are held in place by the removable cartridge 18 allowing the user to easily replace the seals 18b and not to have to worry about pinching the seals 18b or the seals 18b slipping off. The design also provides easy maintenance in an already crowded environment.

The Scope of the Invention

It should be understood that, unless stated otherwise herein, any of the features, characteristics, alternatives or modifications described regarding a particular embodiment herein may also be applied, used, or incorporated with any other embodiment described herein. Also, the drawings herein are not drawn to scale.

Although the invention has been described and illustrated with respect to exemplary embodiments thereof, the foregoing and various other additions and omissions may be made therein and thereto without departing from the spirit and scope of the present invention.

We claim:

1. A gate valve for controlling the flow of a medium through a suitable plumbing line or system, comprising:
   a valve housing for coupling the gate valve to the suitable plumbing line or system;
   a detachable drive unit having a movable blade arranged therein;
   detachable blade seals or blade seal cartridge for slidably arranging in the valve housing in order to receive the movable blade to control the flow of the medium through the gate valve and to prevent the medium from entering the drive unit; and
   a latching mechanism for detachably coupling both the drive unit and blade seals or blade seal cartridge to and from the valve housing so as to enable replacement of either the drive unit, the blade seals, or both, without having to remove the valve housing from the suitable plumbing line or system, the latching mechanism including corresponding apertures in the detachable drive unit and blade seals or blade seal cartridge that align with associated apertures in the valve housing and corresponding fastening devices for passing through the corresponding apertures to detachably couple the drive unit and blade seals or blade seal cartridge to and from the valve housing.

2. A gate valve according to claim 1, wherein the latching mechanism include a first latching mechanism for coupling the driving unit to the blade seals or blade seal cartridge and a second latching mechanism for coupling the blade seals or blade seal cartridge to the valve housing.

3. A gate valve according to claim 1, wherein the latching mechanism couples the driving unit to the valve housing and holds the blade seals or blade seal cartridge therein.

4. A gate valve according to claim 1, wherein the drive unit has a drive with drive threads and the blade has corresponding threads for coupling to the drive threads of the drive to rotatably drive the movable blade up and down.

5. A gate valve according to claim 4, wherein the drive is manually rotated.

6. A gate valve according to claim 4, wherein the drive has a gear arranged thereon, and the drive unit has a motor with a gear coupled to the gear of the drive for electromechanically rotating the drive.

7. A gate valve according to claim 6, wherein the drive unit is switchable between an electrical or manual operational mode.

8. A gate valve according to claim 7, wherein the shaft of the drive has at least one portion having a smaller diameter than the shaft for receiving the detachably clip.

9. A gate valve according to claim 1, wherein the the movable blade slides between the blade seals or blade seal cartridge.

10. A gate valve for controlling the flow of a medium through a suitable plumbing line or system, comprising:
    a valve housing for coupling the gate valve to the suitable plumbing line or system;
    a detachable drive unit having a movable blade arranged therein;
    a removable blade seal cartridge assembly having
      a removable blade seal cartridge configured to couple detachably to the drive unit and slide into the valve housing so as to enable replacement of the blade seal cartridge without having to remove the valve housing from the suitable plumbing or plumbing adapters, and
      one or more removable substantially circular blade seals that is arranged in a circular opening formed in the removable blade seal cartridge, that is configured to sweep clean opposing faces of a movable blade of the drive unit that controls the flow of the medium through the valve housing so as to keep the medium from entering the drive unit, and that is also configured to enable the replacement thereof without having to remove the valve housing from the suitable plumbing or plumbing adapters; and
    a latching mechanism for detachably coupling both the drive unit and blade seals or blade seal cartridge to and from the valve housing so as to enable replacement of either the drive unit, the blade seals, or both, without having to remove the valve housing from the suitable plumbing line or system.

11. A gate valve according to claim 10, wherein the latching mechanism includes corresponding apertures in the detachable drive unit and blade seals or blade seal cartridge that align with associated apertures in the valve housing and corresponding fastening devices for passing through the corresponding apertures to detachably couple the drive unit and blade seals or blade seal cartridge to and from the valve housing.

12. A gate valve according to claim 10, wherein the latching mechanism include a first latching mechanism for coupling the driving unit to the blade seals or blade seal cartridge and a second latching mechanism for coupling the blade seals or blade seal cartridge to the valve housing.

13. A gate valve according to claim 10, wherein the latching mechanism couples the driving unit to the valve housing and holds the blade seals or blade seal cartridge therein.

14. A gate valve according to claim 10, wherein the drive unit has a drive with drive threads and the blade has corresponding threads for coupling to the drive threads of the drive to rotatably drive the movable blade up and down.

15. A gate valve according to claim 14, wherein the drive is manually rotated.

16. A gate valve according to claim 14, wherein the drive has a gear arranged thereon, and the drive unit has a motor with a gear coupled to the gear of the drive for electromechanically rotating the drive.

17. A gate valve according to claim 16, wherein the drive unit is switchable between an electrical or manual operational mode.

18. A gate valve according to claim 17, wherein the shaft of the drive has at least one portion having a smaller diameter than the shaft for receiving the detachably clip.

19. A gate valve according to claim 10, wherein the the movable blade slides between the blade seals or blade seal cartridge.

* * * * *

UNITED STATES PATENT AND TRADEMARK OFFICE
CERTIFICATE OF CORRECTION

| | | |
|---|---|---|
| PATENT NO. | : 7,600,739 B2 | Page 1 of 1 |
| APPLICATION NO. | : 11/728031 | |
| DATED | : October 13, 2009 | |
| INVENTOR(S) | : David L. Phillips et al. | |

It is certified that error appears in the above-identified patent and that said Letters Patent is hereby corrected as shown below:

1. In column 2 at line 16, after "agricultural" please insert --.--.

2. In column 3 at line 55, "plumping" should be --plumbing--.

Signed and Sealed this
Fifth Day of April, 2011

David J. Kappos
*Director of the United States Patent and Trademark Office*